(12) United States Patent
Macht et al.

(10) Patent No.: US 9,404,544 B2
(45) Date of Patent: Aug. 2, 2016

(54) SLAVE CYLINDER FOR A VIBRATION-DAMPED HYDRAULIC FORCE TRANSMISSION SYSTEM, PARTICULARLY A HYDRAULIC CLUTCH ACTUATING SYSTEM FOR MOTOR VEHICLES

(71) Applicant: FTE automotive GmbH, Ebern (DE)

(72) Inventors: Egid Macht, Munich (DE); Paul Marks, Ebern (DE); Robert Müller, Maroldsweisach (DE); Jürgen Ryba, Reckendorf (DE); Wilfried Weibelzahl, Grub (DE)

(73) Assignee: FTE automotive GmbH, Ebern (DE)

( * ) Notice: Subject to any disclaimer, the term of this patent is extended or adjusted under 35 U.S.C. 154(b) by 90 days.

(21) Appl. No.: 14/088,764

(22) Filed: Nov. 25, 2013

(65) Prior Publication Data

US 2014/0076681 A1 Mar. 20, 2014

Related U.S. Application Data

(62) Division of application No. 12/691,237, filed on Jan. 21, 2010, now Pat. No. 8,636,128.

(30) Foreign Application Priority Data

Jan. 22, 2009 (DE) .......................... 10 2009 005 828

(51) Int. Cl.
*F16D 25/08* (2006.01)
*F16D 48/02* (2006.01)
(Continued)

(52) U.S. Cl.
CPC .............. *F16D 25/14* (2013.01); *F15B 21/008* (2013.01); *F16D 23/12* (2013.01); *F16D 25/088* (2013.01);
(Continued)

(58) Field of Classification Search
CPC .................................................. F16D 2025/081
USPC .................................... 192/85.59, 82 T, 109 F
See application file for complete search history.

(56) References Cited

U.S. PATENT DOCUMENTS

| 2,372,587 A | 3/1945 | Krueger |
| 5,816,046 A | 10/1998 | Paeth et al. |

(Continued)

FOREIGN PATENT DOCUMENTS

| DE | 38 14 747 A1 | 11/1988 |
| DE | 36 31 507 C2 | 10/1991 |

(Continued)

OTHER PUBLICATIONS

European Search Report, Application No. 09 015 461.8-175, Applicant: FTE automotive GmbH, Mailing Date: Mar. 12, 2013, 4 pages.

*Primary Examiner* — Robert Hodge
*Assistant Examiner* — Stacey Fluhart
(74) *Attorney, Agent, or Firm* — Reising Ethington P.C.

(57) ABSTRACT

A slave cylinder for a vibration-damped hydraulic force transmission system, particularly a hydraulic clutch actuating system for motor vehicles is disclosed, comprising a cylinder housing, a piston received therein to be longitudinally displaceable and a pressure chamber which is bounded by the cylinder housing and the piston and which can be selectably acted on by a pressure medium, by way of a pressure connection provided in the cylinder housing, in order to displace the piston in the cylinder housing. An insert member which is inserted in the pressure chamber and secured in the pressure connection and which is equipped with a device for reducing pressure pulses, the device being constantly open to the pressure medium, is additionally provided. As a result, the vibration-damping measures or means are integrated in the slave cylinder in a particularly economic and space-saving manner.

19 Claims, 7 Drawing Sheets

(51) Int. Cl.
  *F15B 21/00* (2006.01)
  *F16D 23/12* (2006.01)
  *F15B 15/22* (2006.01)

(52) U.S. Cl.
  CPC ......... *F15B 15/222* (2013.01); *F16D 2025/081* (2013.01); *F16D 2048/0212* (2013.01); *F16D 2048/0215* (2013.01)

(56) References Cited

U.S. PATENT DOCUMENTS

| | | | |
|---|---|---|---|
| 5,836,235 A | 11/1998 | Rudiger et al. | |
| 6,343,541 B1 | 2/2002 | Ebert et al. | |
| 6,345,566 B1 | 2/2002 | Stevens | |
| 6,647,722 B2 | 11/2003 | Schorr et al. | |
| 7,107,768 B2 | 9/2006 | Welter et al. | |
| 7,287,376 B2 | 10/2007 | Macht et al. | |
| 7,578,378 B2 | 8/2009 | Gebert et al. | |
| 2003/0155026 A1 | 8/2003 | Michlin et al. | |
| 2006/0120907 A1* | 6/2006 | Macht et al. | 417/570 |
| 2006/0243552 A1* | 11/2006 | Gebert et al. | 192/30 V |

FOREIGN PATENT DOCUMENTS

| | | |
|---|---|---|
| DE | 43 22 969 A1 | 1/1995 |
| DE | 199 20 821 C1 | 8/2000 |
| DE | 103 51 089 A1 | 5/2005 |
| DE | 10 2006 016 938 B3 | 12/2007 |
| EP | 0 441 137 B1 | 1/1991 |
| EP | 0 591 064 A1 | 4/1994 |
| EP | 1 637 793 B1 | 9/2005 |
| EP | 1 967 744 A2 | 9/2008 |
| GB | 2 348 259 A | 9/2000 |
| JP | 59089833 A | 5/1984 |
| WO | WO 2007/022830 A1 | 3/2007 |

* cited by examiner

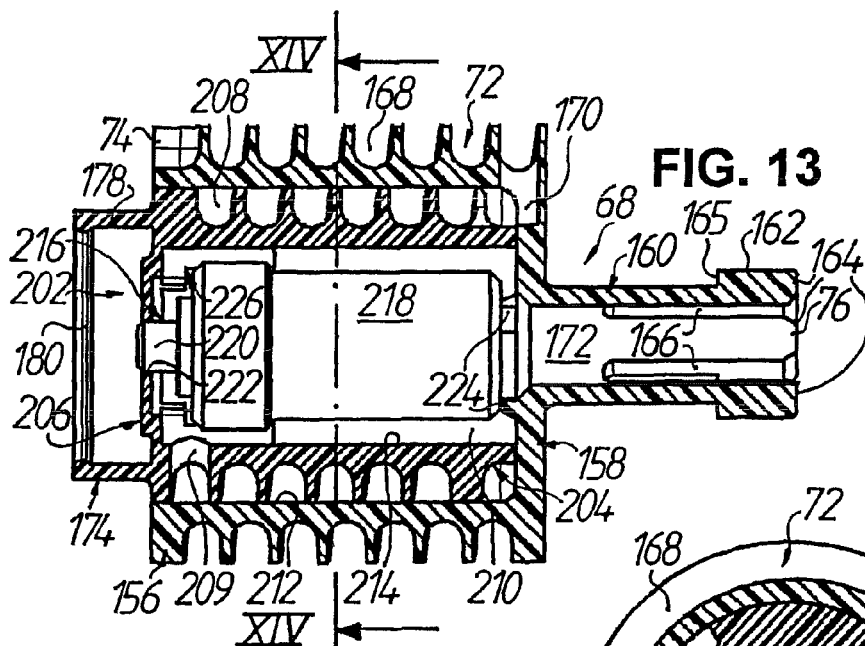
FIG. 13
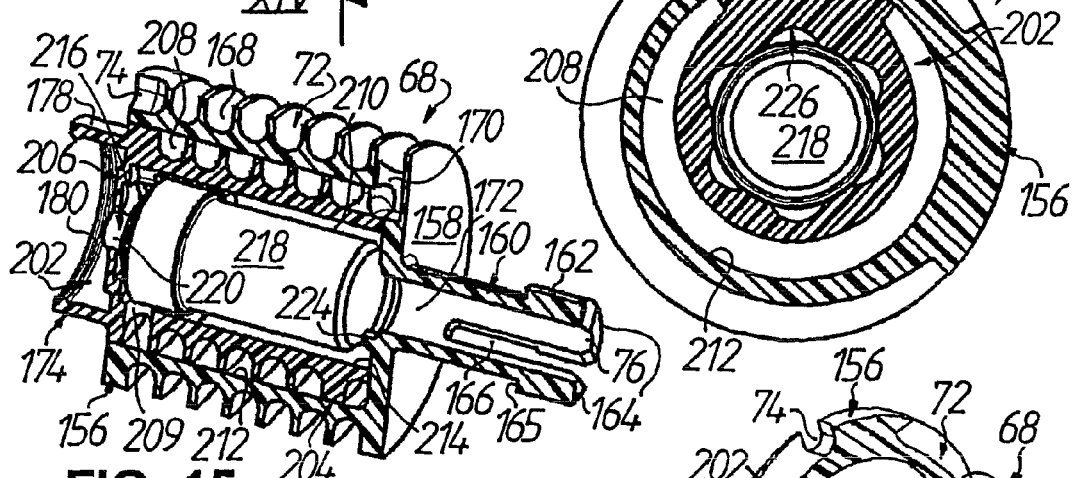
FIG. 14
FIG. 15
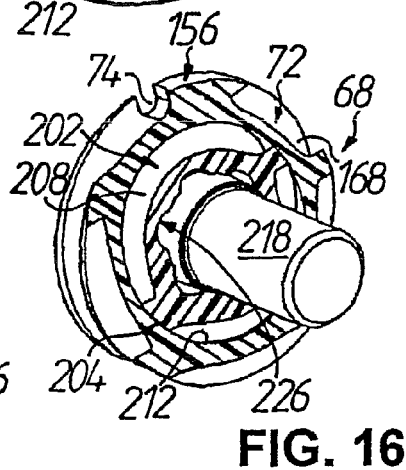
FIG. 16
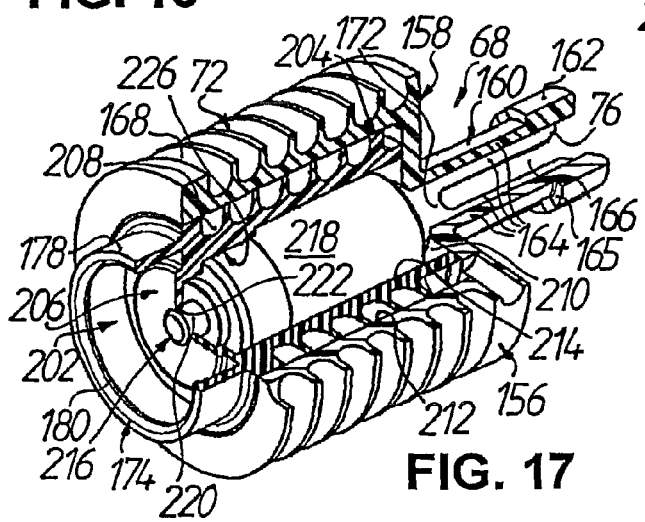
FIG. 17

SLAVE CYLINDER FOR A VIBRATION-DAMPED HYDRAULIC FORCE TRANSMISSION SYSTEM, PARTICULARLY A HYDRAULIC CLUTCH ACTUATING SYSTEM FOR MOTOR VEHICLES

FIELD OF THE INVENTION

The present invention relates to a slave cylinder for a vibration-damped hydraulic force transmission system and, in particular, to slave cylinders such as are in widespread use in hydraulic clutch actuating systems for motor vehicles.

DESCRIPTION OF THE PRIOR ART

FIG. 19 shows a conventional hydraulic clutch actuating system for motor vehicles in simplified illustration. The hydraulic clutch actuating system 10 comprises a master cylinder 12 mounted on a pedal block 11 of the motor vehicle and a slave cylinder 14 fixed in the motor vehicle in the vicinity of a transmission, the cylinders being hydraulically connected together by way of a hydraulic line 16 which, starting from the master cylinder 12, here consists of a first pipe length 18, a hose length 20 and a second pipe length 22. The piston (not illustrated) of the master cylinder 12, which is hydraulically connected with an equalizing reservoir 24, is operatively connected with a clutch pedal 28 by way of a piston rod 26 so that the master cylinder 12 can be actuated by pressing down the clutch pedal 28, which produces a displacement of the piston in the master cylinder 12. As a result, a fluid column is pushed through the hydraulic line 16 in the direction of the slave cylinder 14 and hydraulically actuates the slave cylinder 14.

The slave cylinder 14, more specifically the piston (not shown here) thereof, is operatively connected by means of a piston rod 30 with a release mechanism 36 of a friction clutch 38 via a release lever 32 and a thrust bearing 34. If for release of the friction clutch 38 the slave cylinder 14 is hydraulically loaded, then a clutch pressure plate 40 is separated by means of the release mechanism 36 from a clutch driven plate 44, which is seated on a transmission shaft 42 and co-operates with a flywheel 43 carried by the crankshaft of the internal combustion engine (not illustrated), of the friction clutch 38 and thus also the internal combustion engine from the transmission (similarly not shown in more detail) of the motor vehicle.

If the clutch pedal 28 is relieved of load in order to re-engage the friction clutch 38 the slave cylinder 41, more specifically the piston thereof, is as a consequence of inter alia the spring forces of the friction clutch 38 returned to its basic or starting setting, whereby the above-mentioned fluid column is pushed through the hydraulic line 16 back again in the direction of the master cylinder 12.

In such a hydraulic clutch actuating system 10—which is to be regarded as a quasi-static hydraulic force transmission system in which there is no continuous flow of the hydraulic fluid—vibrations of the internal combustion engine, particularly the crankshaft thereof, are transmitted by way of the components of the friction clutch 38, the thrust bearing 34, the release lever 32 and the slave cylinder 14 to the fluid column present between slave cylinder 14 and master cylinder 12 in the hydraulic line 16, in which column the vibrations propagate as pressure pulses. It would be regarded as disadvantageous that these pressure pulses are felt as vibrations at the clutch pedal 28 by the driver particularly when his or her foot rests on the clutch pedal 28 in typical urban driving—so-called 'contact tingling'—or the depressed clutch pedal 28 is held during, for example, a pause in front of traffic lights.

There is thus no lack of proposals in the state of the art as to how to counteract this problem (for example, DE 36 31 507 C2 'square helix', DE 40 03 521 C2 'double line with line branches of different length', DE 195 40 753 C1 'auxiliary vibrator', DE 101 12 674 C1 'diaphragm damper cell' and DE 103 51 907 A1 'damping device with labyrinth body'). It is common to these proposals that inserted or arranged in or parallel to the hydraulic line between master cylinder and slave cylinder is a separate subassembly for vibration damping, which does not interrupt the fluid column between master cylinder and slave cylinder and which is also generally capable of satisfactorily damping the pressure pulses. However, sufficient installation space for accommodation of such subassemblies is not always available in the engine bay. Moreover, this procedure increases the number of hydraulic connecting points (for example detent or screw connections) between the subassemblies involved and thus inevitably the risk of leakages as well as the assembly cost.

Against this background it was already proposed (for example DE 199 20 821 C1, DE 10 2005 044 582 A1) to accommodate an auxiliary vibrator or vibration damper in the housing of the master cylinder, more specifically in the pressure chamber thereof, for which purpose, however, it would be necessary to provide cylinder housings which are specially designed, thus incurring extra cost, and which in particular are extended in axial direction, with a special receiving and/or mounting capability for the auxiliary vibrator or vibration damper. Moreover, installation space is frequently restricted particularly at the pedal block or in the region of the splashboard in a motor vehicle, so that bulky master cylinders are not desirable.

In this connection closer account need not be taken of 'double-acting' valve mechanisms which are connected between master cylinder and slave cylinder (for example JP 59-89833 A, EP 1 719 921 A2) and which open with each displacement of the fluid column, i.e. not only on displacement in the direction of the slave cylinder, but also on displacement in the direction of the master cylinder, and close when the fluid column is not moved, so as to separate the master cylinder, or decouple it in terms of vibration, from the slave cylinder, since these valve mechanisms (a) are as a rule of dissimilar and expensive construction as constantly 'pressure-medium-open' damping devices not needing spring-biased valve bodies or the like, (b) oblige specific opening and closing pressures, which often undesirably increase return travel times and the system hysteresis, and finally (c) are provided with bypasses more susceptible to contaminations and accompanying losses in performance.

What is needed is a vibration-damped hydraulic force transmission system, particularly a hydraulic clutch actuating system for motor vehicles, where the vibration-damping measures are integrated in the force transmission system in the most economic and space-saving manner as possible.

SUMMARY OF THE INVENTION

According to the invention, provided in a slave cylinder for a vibration-damped hydraulic force transmission system, particularly a hydraulic clutch actuating system for motor vehicles, which comprises a cylinder housing, a piston received therein to be longitudinally displaceable and a pressure chamber which is bounded by the cylinder housing and the piston and can be selectably acted on by a pressure medium, by way of a pressure connection provided in the cylinder housing, in order to displace the piston in the cylinder housing, is an insert member which is inserted in the pressure chamber and secured in the pressure connection and which is equipped with a device for reducing pressure pulses, the device being constantly open to the pressure medium.

Due to the fact that the insert member equipped with the device for reducing pressure pulses is inserted into the pressure chamber of the slave cylinder—for which purpose no additional installation space has to be provided, since use can be made of the cylinder dead space present there anyway, as a consequence of which the axial length of the slave cylinder is unchanged by comparison with conventional constructions—the integration of the vibration-damping measures in the force transmission system is realized at the outset in highly space-saving manner; by contrast to the prior art, it is not necessary to provide and mount any vibration-damping subassemblies either in the hydraulic line between master cylinder and slave cylinder or in the master cylinder. Since, in addition, the insert member is secured in the pressure connection of the slave cylinder, it is not necessary to undertake any additional constructional measures for the installation/mounting of the insert member, but an existing slave cylinder such as known from, for example, EP 1 666 752 A2 of the applicant can be utilized unchanged in order to integrate the insert member. Through the arrangement of the device for reducing pressure pulses in the pressure chamber of the slave cylinder, i.e. in the immediate vicinity of the point of introduction of the vibrations into the fluid column, it is additionally ensured in advantageous manner that the pressure pulses cannot propagate at maximum amplitude in/through the hydraulic line between slave cylinder and master cylinder, so that the risk of the hydraulic line detaching from its fastening points at, for example, the bodywork of the motor vehicle due to vibration or shaking loose therefrom is also minimized. A further advantage of the arrangement of the device for reducing pressure pulses in the pressure chamber of the slave cylinder consists in that when a slave cylinder equipped in that manner is utilized in an otherwise conventional hydraulic clutch actuating system according to FIG. 19 the second pipe length—near the slave cylinder—of the hydraulic line, which in order to reduce vibration would usually be constructed with a narrowed cross-section by comparison with the first pipe length, can be eliminated, i.e. the hose length of the hydraulic line can now be directly connected with the pressure connection of the slave cylinder, which on the one hand significantly reduces costs and the need for installation space (omission of the second pipe length, an associated mount and a plug connection) and on the other hand through elimination of the said plug connection results in a smaller size and more robust construction.

In a compact construction which is particularly simple in terms of production the insert member can be of substantially pot-shaped construction with a shroud section and a base, with which a substantially hollow-cylindrical extension inserted into the pressure connection of the cylinder housing is connected.

In principle, it is possible to fix the insert member in the pressure connection of the cylinder housing by force couple (for example, by means of a press fit) or material couple (for example by a welded or glued connection). However, it is preferred, particularly with respect to simple assembly, to secure the insert member in the pressure connection of the cylinder housing by axial mechanically positive couple, namely by means of a snap connection. In this regard, in an advantageous embodiment the extension of the insert member is provided at the outer circumference with an annular collar going out from its free end and is multiply longitudinally slotted for formation of a plurality of spring arms, wherein in the mounted state of the insert member the annular collar at the extension engages behind an annular end surface, which is remote from the pressure chamber, in the pressure connection of the cylinder housing. In that case it is particularly advantageous in terms of cost if the cylinder housing comprises a base body of plastics material provided with a bore in which a metallic guide sleeve for the piston is inserted, the annular end surface, behind which the insert member engages, in the pressure connection of the cylinder housing being formed by an end of the guide sleeve of the cylinder housing.

In a first variant, the device for reducing pressure pulses can comprise an additional conduit path in the form of a channel with an opening at the pressure chamber side and an opening at the pressure connection side, the channel having a length amounting to a multiple of the direct spacing between the two openings. The second pipe length according to FIG. 19 is thus quasi integrated in the slave cylinder in a simple and very space-saving manner. Although various courses of the channel are conceivable, it is preferred particularly from production aspects if the channel has a helically extending helix section. In this connection, the helix section of the channel can be formed at the outer circumference of the shroud section of the insert member as a groove which is radially outwardly covered by an inner circumferential surface of the cylinder housing, which on the one hand is producible particularly simply and economically—for example by means of injection-molding of the insert member, the radially outwardly open groove of which is then 'complemented' to form the channel in extremely simple manner only at the time of insertion of the insert member into the pressure chamber of the slave cylinder by the cylinder wall present there in any case, and thus without use of sealing elements or the like—and on the other hand effects a deflection of the fluid column, which has proved advantageous with respect to good vibration damping with smallest possible throughflow resistance. In an advantageous embodiment the channel can in this regard have an end section which is formed by the extension of the insert member and which is connected with the helix section by a connecting section of the channel, the connecting section extending in the base of the insert member. With respect to a best possible damping action it has additionally proved advantageous if the helix section of the channel has a cross-section smaller than or equal to the minimum cross-section of the pressure connection. In order to ensure good deaeration of the slave cylinder with a flushing action for any air bubbles contained in the pressure chamber, the opening of the channel at the pressure chamber side is preferably disposed at the top adjacent to the inner circumferential surface of the cylinder housing in the installed position of the slave cylinder.

In a second variant, the device for reducing pressure pulses can comprise a volume receiving means which is mounted at the insert member and which is elastically deformable under pressure in order to damp or reduce vibrations. In this connection, for a particularly compact construction the volume receiving means can be mounted at the inner circumference of the shroud section of the insert member. The volume receiving means is preferably a rubber-elastic spool-shaped element with a passage bore and an annular recess at the outer circumferential side, which recess together with the inner circumference of the shroud section of the insert member bounds an annular air chamber. In such a construction of the volume receiving means, if a pressure amplitude runs into the passage bore, the spool-shaped element deforms against the spring effect of the rubber-elastic material, whereby the air volume in the annular air chamber is compressed so that the spool-shaped element—as the term "volume receiving means" indeed implies—experiences a defined expansion in the region of the passage bore, leading to a degree of 'pressure relief' of the pressure amplitude. In this regard, the spring effect of the rubber-elastic material and the compressed air volume ensures automatic restoration of the spool-shaped element to its initial form if the pressure of the pressure medium prevailing in the region of the passage bore of the spool-shaped element drops below a predetermined value.

It has proved particularly effective in terms of damping or reducing vibration if in the case of a combination of the two afore-described variants of the device for reducing pressure pulses the volume receiving means as seen from the pressure chamber of the slave cylinder is hydraulically connected upstream of the channel forming the additional conduit path, so that the pressure pulse propagating from the pressure chamber of the slave cylinder does not have to initially transit the additional conduit path in order to reach the volume receiving means. In this connection, in an embodiment of particularly short and compact construction the helix section of the channel can coaxially surround the volume receiving means.

The afore-described first variant of the device for reducing pressure pulses by means of an additional conduit path can appropriately develop the respective functional requirements in the manner that the insert member comprises an inner insert of substantially pot-shaped construction with an inner insert shroud section and an inner insert base, wherein formed between the shroud section of the insert member and the inner insert shroud section is a helically extending helix section prolongation of which one end thereof is in fluid connection with the helix section and the other end thereof in fluid connection with an interior space of the inner insert, which interior space in turn communicates with the pressure connection. As a result, the additional conduit path can thus be prolonged as desired or needed in simple manner without at the same time increasing the need for axial constructional volume. Here as well it is of advantage particularly with respect to an economic capability of manufacture by means of, for example, injection-molding from plastics material if the helix section prolongation is formed at the outer circumference of the inner insert shroud section as a groove, which is radially outwardly covered by an inner circumferential surface—present there anyway—of the shroud section of the insert member; sealing elements or the like are again superfluous in this embodiment.

In further pursuance of the concept of the invention a thermostatically operating bypass valve providing a direct fluid connection between the pressure chamber and the pressure connection at low temperatures and interrupting this fluid connection at higher temperatures can be provided in the insert member in hydraulically parallel connection with the device for reducing pressure pulses. In the case of low temperatures at which the hydraulic medium—usually brake fluid—is already relatively viscous this embodiment has the advantage on the one hand that the forces to be exerted on the clutch pedal in the event of quick actuation do not undesirably increase and on the other hand that the return speed of the clutch pedal does not undesirably decrease. Advantageously, the bypass valve in this regard comprises a thermostatic element received in the interior space of the inner insert between the base of the insert member and the inner insert base and operatively connected with a plunger which opens or closes an opening in the inner insert base in dependence on temperature in order to provide the direct fluid connection between the pressure chamber and the pressure connection at low temperatures and to interrupt this fluid connection at higher temperatures.

In a further, advantageous embodiment the insert member or the inner insert has at the end thereof at the pressure chamber side a fastening section which so co-operates with an extension of the piston at the pressure chamber side that the piston prior to filling with pressure medium or first actuation of the slave cylinder is fixed in a predetermined stroke setting with respect to the cylinder housing and is releasable relative to the cylinder housing by the pressure medium filling or first actuation of the slave cylinder. Through the temporary fastening of the piston relative to the cylinder housing by the fastening section at the insert member or the inner insert and the extension at the piston it is possible, inter alia, to mount the slave cylinder at its place of use substantially free of force, since in that case the spring element usually present at or in the slave cylinder and serving to reset the piston does not have to be compressed by pushing the piston rod, which is operatively connected with the piston, into the cylinder housing, but the piston and thus also the piston rod can be temporarily held by means of the fastening section and extension in a defined stroke setting—which is advantageous for mounting—with respect to the cylinder housing against the force of the spring element. Other purposes of use of this embodiment include avoidance of overfilling of a hydraulic system, which includes such a slave cylinder, at the time of prefilling thereof, wherein the fastening section and extension ensure that the slave cylinder prior to first actuation thereof can accept only a predetermined amount of hydraulic fluid, as well as safeguarding the slave cylinder of such a construction against transport damage, wherein the fastening section and extension during transport of the slave cylinder prevent excessive protrusion of the piston rod from the cylinder housing. With respect to simple and economic production and provision of the premounting position of the piston it is preferred if the fastening section of the insert member comprises a hollow cylinder, which is axially aligned with respect to a center axis of the pressure chamber, with an annular bead at the inner circumferential side, while the central extension at the piston is provided at the outer circumferential side with an annular collar which engages behind the annular bead in the manner of a snap connection when the piston is fixed to the insert member.

Basically, the insert member can be made of a metallic material, for example an aluminum alloy, for example by machining. Ultimately, however, it is conducive to, in particular, provision of a device favorable in cost if the insert member is injection-molded from a plastics material, as already mentioned.

BRIEF DESCRIPTION OF THE DRAWINGS

The invention will be explained in more detail below on the basis of preferred exemplifying embodiments and with reference to the accompanying, partly schematic drawings, in which identical reference numerals denote identical or corresponding parts and elastomeric parts are mostly shown in the undeformed state in order to simplify the illustration. In the drawings:

FIG. 13 shows a longitudinal sectional view of the insert member, which in the case of the slave cylinder according to FIG. 12 is secured in the pressure connection, with inner insert and bypass valve, FIG. 14 shows a sectional view of the insert member according to FIG. 13 in correspondence with the section line XIV-XIV in FIG. 13, FIG. 15 to FIG. 17 show broken-away perspective illustrations of the insert member according to FIG. 13 for clarification of the pressure medium paths, which can be freed by a thermostatic element of the bypass valve, for a direct fluid connection between the pressure chamber and the pressure connection of the slave cylinder.

DETAILED DESCRIPTION OF THE PREFERRED EMBODIMENTS

Figure 1:
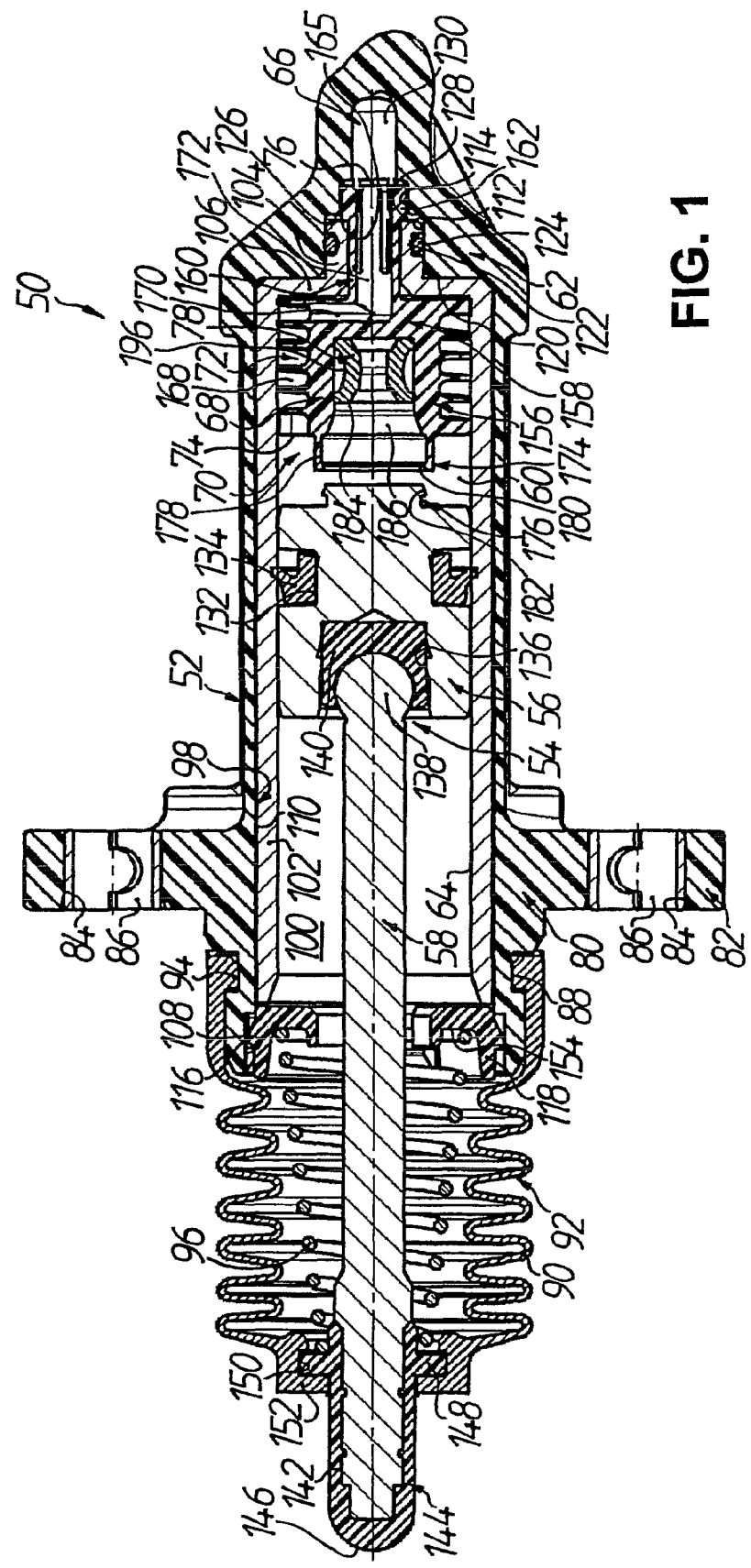
FIG. 1 shows a longitudinal sectional view of a slave cylinder for a hydraulic clutch actuating system for motor vehicles, in the pressure chamber of which is inserted an insert member equipped with a device for reducing pressure pulses, the device being constantly open to the pressure medium and having in combination an additional conduit path in the form of a channel and a volume receiving means, according to a first embodiment of the invention.
Figure 2:
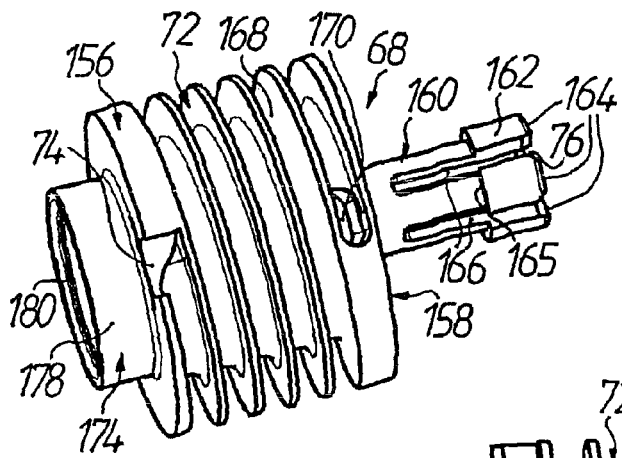
FIG. 2 shows a perspective illustration, obliquely from the front, of the insert member which, in the case of the slave cylinder according to FIG. 1, is secured in the pressure connection.
Figure 3:
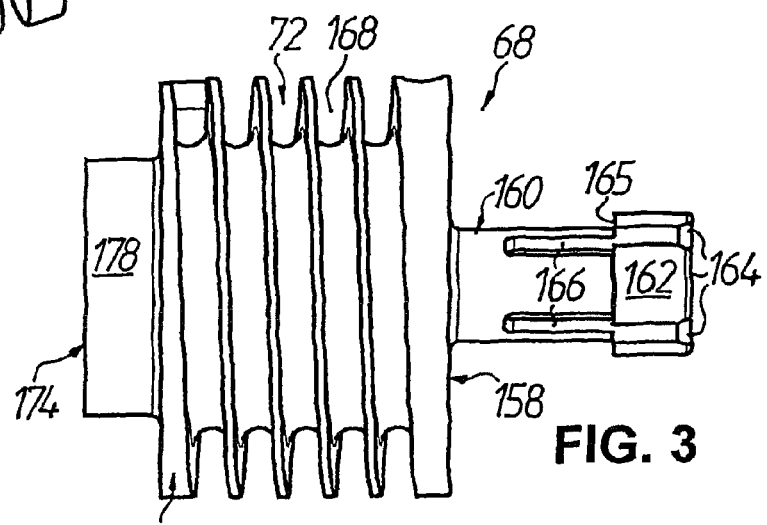
FIG. 3 shows a side view of the insert member according to FIG. 2.
Figure 4:
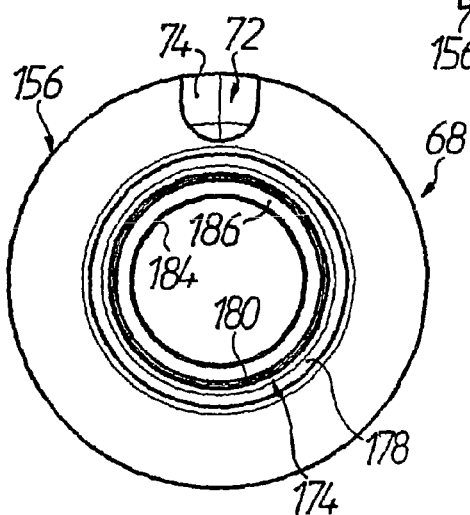
FIG. 4 shows a front view of the insert member according to FIG. 2, from the left in FIG. 3.
Figure 5:
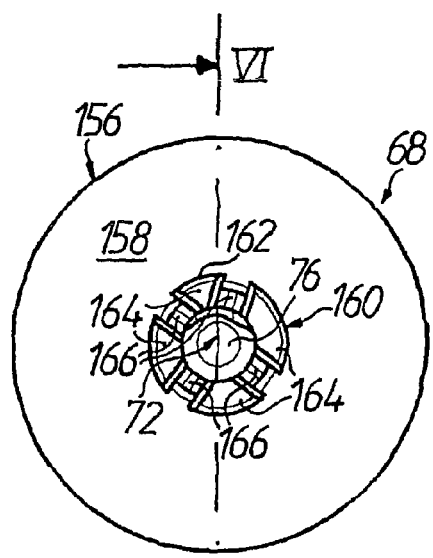
FIG. 5 shows a back view of the insert member according to FIG. 2, from the right in FIG. 3.
Figure 19:
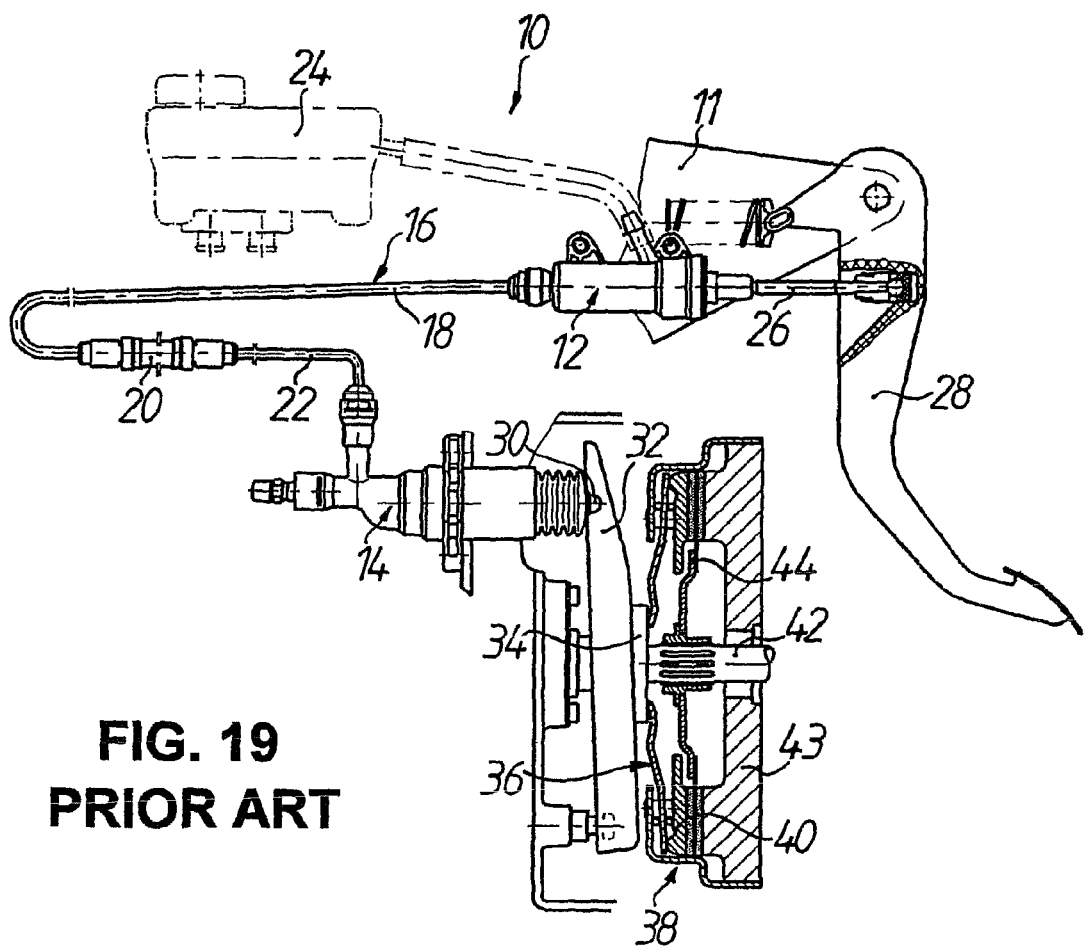
FIG. 19 shows a diagrammatic illustration of a hydraulic clutch actuating system according to the prior art.

FIG. 1 shows a slave cylinder 50 for a vibration-damped hydraulic force transmission system, namely a vibration-damped clutch actuating system for motor vehicles. The slave cylinder 5 has a cylinder housing which is denoted generally by 52 and in which a piston subassembly 54 is received to be longitudinally displaceable, the subassembly comprising a piston 56 and a piston rod 58 connected with the piston 56 at least rigidly in tension and compression, thus to be effective in terms of actuation. Disposed in the cylinder housing 52 is a pressure chamber 60 which is bounded on the lefthand side in FIG. 1 in variable manner by the piston 56, on the righthand side in FIG. 1 in fixed manner by a housing base 62 of the cylinder housing 52, and radially outwardly in fixed manner by a circumferential wall 64 of the cylinder housing 52. The pressure chamber 60 can be selectably acted on by a pressure medium, for example brake fluid, by way of a pressure connection 66, which is provided at the housing base 62 and which in the mounted state of the slave cylinder 50 is connected with a clutch master cylinder in a manner known per se (cf. FIG. 19) via a pressure line (which by comparison with FIG. 19 can optionally also be of different construction) in order to displace the piston 56 in the cylinder housing 52. As is described in more detail in the following, inserted in the pressure chamber 60 to adjoin the housing base 62 is an insert member 68 which is secured in the pressure connection 66 and in the first embodiment illustrated here advantageously fulfils several functions. In this connection, the insert member 68 serves, in particular, as a support for a device 70 for reducing pressure pulses, the device being constantly open to the pressure medium, or is equipped with this device.

As will be explained in detail further below, the device 70 for reducing pressure pulses thus connected in the mounted state of the slave cylinder 50 between the pressure chamber 60 of the slave cylinder 50 and a pressure chamber of the master cylinder (cf. again FIG. 19) comprises on the one hand an additional conduit path in the form of a channel 72, which has an opening 74 at the pressure chamber side or slave cylinder side, an opening 76 at the pressure connection side or master cylinder side and intermediately a channel length amounting to a multiple of the direct spacing, i.e. the 'straight line spacing', between the two openings 74 and 76, and on the other hand a volume receiving means 78 which is mounted at the insert member 68 and is resiliently deformable under pressure. As a result, the channel 72 and the volume receiving means 78 of the device 70 for reducing pressure pulses are combined in the cylinder housing 52 with maximum compactness to form a subassembly, wherein the insert member 68 at least in part together with the cylinder housing 52 bounds the channel 72.

According to FIG. 1 the cylinder housing 52 comprises a base body 80, which is preferably injection-molded from plastics material and which is provided on the outer circumference with a fastening flange 82 for mounting of the slave cylinder 50 in the motor vehicle. The fastening flange 82 has two fastening bores 84 reinforced by means of slotted steel bushes 86. Extending through the fastening bores 84, which are lined by the steel bushes 86, in the mounted state of the slave cylinder 50 are, for example, screws (not shown) serving for fastening the slave cylinder 50 to, for example, a transmission wall (not illustrated) in the motor vehicle. The base body 80 of the cylinder housing 52 additionally has, to the left of the fastening flange 82 in FIG. 1, a radial groove 88 at the outer circumference, into which an elastomeric protective cap 92 having a bellows section 90 surrounding the piston rod 58 is buttoned by an annular collar 94 at the inner circumference. The bellows section 90 of the protective cap 92 additionally surrounds a spring element, which is provided on the side of the piston 56 remote from the pressure chamber 60, in the form of a helical compression spring 96 which at its end on the right in FIG. 1 is supported at the cylinder housing 52 and by its end at the left in FIG. 1 engages the piston rod 58 so that the helical compression spring 96 biases the piston subassembly 54 in a direction away from the housing base 62 in order to keep the piston rod 58, in the mounted state of the slave cylinder 50, in contact with a clutch lever (not shown).

At the inner circumferential side the base body 80 of the cylinder housing 52 has a stepped bore 98 open to the left in FIG. 1, in which a preferably metallic guide sleeve 100 as a further component of the cylinder housing 52 is inserted. The guide sleeve 100 has two hollow-cylindrical sleeve sections 102 and 104 of different diameter which are connected together at the housing base 62 of the cylinder housing 52 by way of an annular section 106. Starting from the side at the left in FIG. 1 the stepped bore 98 of the base body 80 now has four bore sections 108, 110, 112 and 114 of different diameter, which reduces in size in FIG. 1 from the left to the right.

The first bore section 108 of the stepped bore 98 in the base body 80 has at its open end an undercut 116 serving for fixing an annular securing element 118, which is slotted for mounting and preferably consists of plastics material, to the cylinder housing 52, which securing element bears against the end surface of the guide sleeve 100 at the left in FIG. 1 and thus secures the guide sleeve 100 in the base body 80 of the cylinder housing 52. The larger-diameter sleeve section 102 of the guide sleeve 100 is tightly received in the second bore section 110 of the stepped bore 98 of the base body 80 and forms by its inner circumferential surface the circumferential wall 64 bounding the pressure chamber 60. The third bore section 112 of the stepped bore 98 is connected with the second bore section 110 by way of an annular shoulder 120 against which the annular section 106 of the guide sleeve 100 bears. The smaller-diameter sleeve section 104 of the guide sleeve 100 is tightly received in the third bore section 112 of the stepped bore 98 in the base body 80. In that case the sleeve section 104 is provided at the outer circumference with a radial groove 122 for reception of an O-ring 124 providing a static seal between the third bore section 112 of the base body 80 and the sleeve section 104 of the guide sleeve 100. The fourth bore section 114 of the base body 80 is connected with the third bore section 112 by way of a further annular shoulder 126, the dimensions of the smaller-diameter sleeve section 104 of the guide sleeve 100 on the one hand and the third and fourth bore sections 112 and 114 of the stepped bore 98 on the other hand being so matched to one another that an annular end surface 128 of the sleeve section 104 of the guide sleeve 100 has a small axial spacing from the annular shoulder 126 of the base body 80 and protrudes radially inwardly beyond this for securing, as described in more detail below, of the insert member 68 in the pressure connection 66. The fourth bore section 114 of the stepped bore 98 in the base body 80 is additionally provided at the inner circumference with a plurality of—here, for example, four—radially inwardly protruding longitudinal ribs (not able to be seen in FIG. 1) which extend in axial direction of the cylinder housing 52 and which are distributed non-uniformly or asymmetrically over the circumference of the fourth bore section 114 and serve for rotational angle orientation of the insert member 68 in the pressure connection 66, as similarly will be explained below in more detail. Finally, a smaller-diameter pressure connecting bore 130 formed in the base body 80 opens into the fourth bore section 114 of the stepped bore 98 at the end of the fourth bore section 114 at the right in FIG. 1.

It is apparent from the above description that the pressure connecting bore 130, the fourth bore section 114 of the stepped bore 98 and the sleeve section 104, which is received in the third bore section 112 thereof, of the guide bore 100 are a component of the pressure connection 66, by way of which the pressure chamber 60 of the slave cylinder 50 can be acted on by the pressure medium. As a consequence of the static sealing, which is produced by the O-ring 124, at the outer circumference of the smaller-diameter sleeve section 104 of the guide sleeve 100 this experiences—when the pressure chamber 60 is loaded with pressure by way of the pressure connection 66, in which the hydraulic pressure on the one hand acts on the annular end surface 128 of the sleeve section 104 and on the other hand on the larger-area end surface opposite thereto of the annular section 106 of the guide sleeve 100, the latter end surface being remote from the pressure chamber 60—a resultant force to the right in FIG. 1, which strives to keep the guide sleeve 100 in the stepped bore 98 of the base body 80, thus relieving the fixing of the guide sleeve 100 in the base body 80 by means of the securing element 118.

As can be further inferred from FIG. 1, the piston 56, which is guided with small radial play in the larger-diameter sleeve section 102 of the guide sleeve 100 of the cylinder housing 52 and is metallic in the illustrated exemplifying embodiment, has at the outer circumference a radial groove 132 for receiving a groove ring 134. The elastomeric groove ring 134 bears in a manner known per se, by its sealing lip at the outer circumference, under a degree of bias against the circumferential wall 64 of the cylinder housing 52 and thus ensures dynamic sealing of the pressure chamber 64 to the left in FIG. 1.

On the lefthand side in FIG. 1 the piston 56 is further provided with a central recess 136 in which a ball head 138 formed at the end of the piston rod 58 at the right in FIG. 1 is pivotably retained by means of a securing element 140 so that the piston rod 58 has a degree of angular movability with respect to the piston 56. Instead of the form of the piston subassembly 54 shown in FIG. 1 this could also be of integral construction with a piston outer surface which drops away conically or spherically towards the piston rod in order to guarantee angular mobility as is known in principle from DE 43 22 969 A1 or DE 43 31 241 A1.

The piston rod 58, which is metallic in the illustrated exemplifying embodiment, has on the side at the left in FIG. 1 a profiled end 142 on which an end piece 144 of plastics material is injection-molded, the end piece having a substantially spherical end surface 146 by way of which the piston rod engages the clutch lever (not illustrated) to be effective in terms of actuation. At the end of the end piece 144 at the right in FIG. 1 this forms an annular collar 148 of the piston rod 58, which on the one hand serves for coupling the protective cap 92 to the piston rod 58, wherein the annular collar 148 engages in mechanically positive manner in an annular recess 150 of substantially complementary form in a fastening section 152 of the protective cap 92, which fastening section is, on the side of the protective cap 92 remote from the pressure chamber 60, connected with the bellows section 90 of the protective cap 92. On the other hand, the annular collar 148 of the piston rod 58 forms by its end face facing the pressure chamber 50 a counter-bearing for the helical compression spring 96, wherein also deriving from the end of the biased helical compression spring 96 facing the annular collar 148 is a degree of radial centering effect for the piston rod 58, which is advantageous when mounting the slave cylinder 50 in the motor vehicle.

It is additionally evident from FIG. 1 that the securing element 118 for retaining the guide sleeve 100 in the cylinder housing 52 is provided on its side remote from the pressure chamber 60 with an axial groove 154 which serves as a further counter-bearing and for centering the end, which faces the pressure chamber 60 and is on the right in FIG. 1, of the helical compression spring 96, which spring widens substantially conically, thus is formed to be frusto-conical, in diameter towards the axial groove 154 starting from the annular collar 148 of the piston rod 58. Through this 'relocation' of the helical compression spring 96 from the pressure chamber 60 and the guide sleeve 100 to the illustrated position between securing element 118 and annular collar 148 at the piston rod 58 the ratio of stroke volume to dead-space volume—or actual volume in the illustrated (installed) basic setting of the piston 56—of the pressure chamber 60 can be advantageously reduced by comparison with prior constructions, which ultimately causes a very short axial constructional length of the actual cylinder housing 52. In addition, since the pressure chamber 60 does not have to accommodate a piston restoring spring at which air bubbles could 'settle', the pressure chamber 60 when the piston 56 returns from an actuated setting to its basic setting is subjected to good flushing or evacuation by the pressure medium, which contributes to particularly good deaeration of the slave cylinder 50.

Further details of the device 70 for reducing pressure pulses, namely with regard to the insert member 68 (FIGS. 2 to 7) injection-molded from a suitable plastics material, for example from a polyamide 66 reinforced with glass fiber, and the elastomeric volume receiving means 78 (FIGS. 8 and 9) incorporated therein, are evident from FIGS. 2 to 9.

Figure 6:
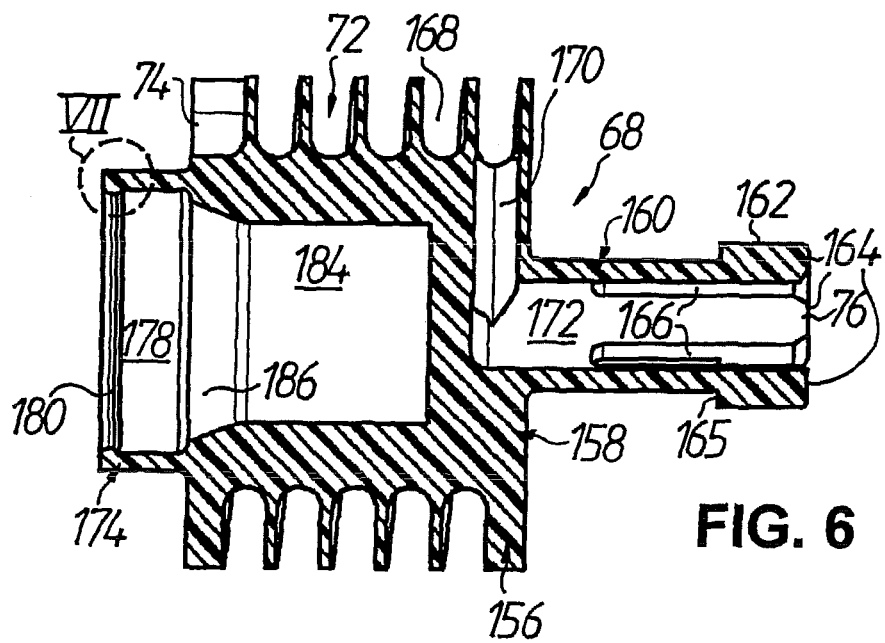
FIG. 6 shows a side view of the insert member according to FIG. 2 in correspondence with the section line VI-VI in FIG. 5.

According to, in particular, FIGS. 1 and 6 the insert member 68 is of substantially pot-shaped construction with a shroud section 156, the outer diameter of which substantially corresponds with the inner diameter of the circumferential wall 64 of the cylinder housing 52, and a base 158, with which a substantially hollow-cylindrical extension 160 is connected, the extension being inserted into the pressure connection 66 of the cylinder housing 52.

More specifically, the insert member 68 is axially mechanically positively fastened in the pressure connection 66 of the cylinder housing 52, specifically by means of a snap connection. For this purpose the extension 160 of the insert member 68 is provided at the outer circumference with a segmented annular collar 162 extending from its free end and is multiply slotted in order to form a plurality of spring arms 164 (see, in particular, FIGS. 2, 3, 5 and 6), wherein according to FIG. 1 a counter-bearing surface formed by the annular collar 162 of the extension 160 and facing the pressure chamber 60 engages in the manner of a snap hook behind the annular end surface 128—which projects radially inwardly beyond the fourth bore section 114 of the stepped bore 98 in the base body 80 and which is formed by the smaller-diameter sleeve section 104 of the guide sleeve 100—in the pressure connection 66 of the cylinder housing 52. According to, in particular, FIG. 5 there are four slots 166 which extend in longitudinal direction of the extension 160 and in the illustrated embodiment interrupt the extension 160 of the insert member 68 and the asymmetrical distribution of which over the circumference of the extension 160 corresponds with the distribution of the above-mentioned longitudinal ribs (not shown) in the fourth bore section 114 of the stepped bore 98 in the base body 80 of the cylinder housing 52. In this connection, the slots 166 in the extension 160 of the insert member 68 on the one hand and the longitudinal ribs in the base body 80 of the cylinder housing 52 on the other hand are dimensionally matched to one another in such a manner that in the mounted state of the insert member 68 the longitudinal ribs at the housing side engage with small circumferential play in the slots 166, but in that case do not protrude radially inwardly beyond the spring arms 164. The asymmetrical, mutually matched circumferential distributions of the longitudinal ribs and the slots 166 ensure in simple manner a unique rotational angle orientation of the mounted insert member 68 in the slave cylinder 50, specifically in such a manner that the opening 74, which is at the pressure chamber side, of the channel 72 of the device 70 for reducing pressure pulses is, in the installed position of the slave cylinder 50, disposed at the top near the inner circumferential surface of the cylinder housing 52 formed by the circumferential wall 64, as shown in FIG. 1.

For preferably automatic production of the afore-described snap connection between the cylinder housing 52 and the insert member 68 oriented in angle with respect to the cylinder housing 52 the insert member is pushed, starting from the open end of the cylinder housing 52 lined with the guide sleeve 100, into the guide sleeve 100 until the spring arms 164 of the extension 160 come into contact with a small incline between the annular section 106 and the inner circumference of the smaller-diameter sleeve section 104 of the guide sleeve 100. On further axial relative displacement of the insert member 68 with respect to the cylinder housing 52 the spring arms 164 spring radially inwardly. As a consequence, the longitudinal ribs (not shown) in the fourth bore section 114 of the base body 80 of the cylinder housing 52 engage in the slots 166 of the extension 160 of the insert member 68 before the spring arms spring back radially outwardly and detent by their segmented counter-bearing surface 165 behind the annular end surface 128 of the sleeve section 104. The base 158 of the insert member 68 comes into contact, by its end face facing the pressure connection 66, with the end surface, which faces the pressure chamber 60, of the annular section 106 of the guide sleeve 100 at substantially the same time. Since both the transition from the end surface, which faces the pressure connection 66, of the spring arms 164 to the outer circumferential surface thereof and the transition of the end surface, which faces the pressure chamber 60, of the longitudinal ribs (not illustrated) to the inner circumferential surface thereof are formed at right angles with only a broken edge, i.e. without incline, the insert member 68 can mate with the cylinder housing 52 only if there is correct angular orientation of these parts. In the event of an attempt to join the insert member to the cylinder housing 52 without angular orientation or with incorrect angular orientation the mutually facing end surfaces of the spring arms 164 on the one hand and the longitudinal ribs (not shown) on the other hand impinge on one another substantially over an area and thereby prevent further axial displacement of the insert member 68 with respect to the cylinder housing 52. Since, moreover, the angular orientation of the insert member 68 with respect to the cylinder housing 52 has effect at the base body 80 thereof, a fixing, which acts in circumferential direction, of the guide sleeve 100 in the base body 80 is not required.

As evident, particularly from FIGS. 1 and 6, the channel 72 in the insert member 68 has a helically extending helix section 168 connected with an end section 172, which is formed by the extension 160 of the insert member 68 and runs in axial direction, via a connecting section 170 extending in the base 158 of the insert member 68 in radial direction, so that the helix section 168 communicates not only with the channel opening 74 at the slave cylinder side, but also with the channel opening 76 at the master cylinder side. In that case the helix section 168 of the channel 72 is formed as a groove at the outer circumference of the shroud section 156 of the insert member 68 preferably by injection-molding, the groove in the mounted state of the insert member 68 being covered radially outwardly by the inner circumferential surface, which is formed by the circumferential wall 64, of the cylinder housing 52. In the illustrated embodiment the helix section 168 has five full turns; it is, however, evident that the helix section can have a greater or lesser number of turns in correspondence with the respective functional requirements, which can—as with other cross-sectional shapes of the helix section departing from the illustrated substantially rectangular cross-sectional shape—be readily managed by injection-molding. The cross-section or cross-sectional area of the helix section 168 of the channel 72 is preferably selected so that it is less than or equal to the minimum cross-section of the pressure connection 66, which in the illustrated embodiment is defined by the pressure connection bore 130.

Figure 7:
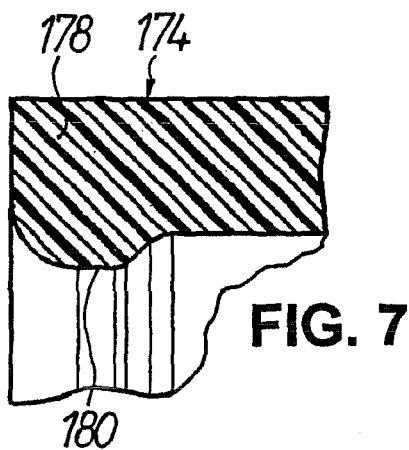
FIG. 7 shows an enlarged-scale illustration of the detail VII in FIG. 6.

According to, in particular, FIGS. 1, 6 and 7 the insert member 68 additionally has at its end at the pressure chamber side a fastening section 174 which so co-operates with a projection 176 of the piston 56 at the pressure chamber side that the piston 56 prior to filling with pressure medium or first actuation of the slave cylinder 50 is fixed in a predetermined stroke setting with respect to the cylinder housing 52 and is releasable relative to the cylinder housing 52 by the pressure medium filling or first actuation of the slave cylinder 50. More specifically, the fastening section 174 of the insert member 68 comprises a hollow cylinder 178, which is connected with the shroud section 156 of the insert member at the left in FIG. 1 and axially aligned with respect to a center axis of the pressure chamber 60, with an annular bead 180 encircling at the inner circumference and protruding radially inwardly, the bead being shown to enlarged scale in FIG. 7, while the center extension 176 at the piston 56 is provided at the outer circumference with an annular collar 182 (see FIG. 1) which has an outer surface slightly tapering towards the pressure connection 66 and which mechanically positively engages behind the annular bead 180 in the fixed state of the piston 56 at the insert member 68. For this purpose the annular bead 180, which according to FIG. 7 in particular is rounded towards the pressure chamber 60, on the one hand and the annular collar 182 on the other hand are dimensionally matched to one another in such a manner that the clear inner diameter of the annular bead 180 is slightly smaller than the largest outer diameter of the annular collar 182, while the spacing thereof from the end surface of the piston 56 is slightly larger than the axial length of the annular bead 180.

For fastening the piston subassembly 54 to the insert member 68 during assembly of the slave cylinder 50 the piston subassembly 54 is pushed into the cylinder housing 52 against the force of the helical compressions spring 96 in the sense of reducing the pressure chamber 60 until the projection 176 at the piston 56 comes into contact by its annular collar 182, which is chamfered towards the insert member 68, with the rounded annular bead 180 facing the pressure chamber 60. On further axial relative displacement of the piston subassembly 54 with respect to the cylinder housing 52 in the direction of the pressure connection 66 the annular collar 182 at the piston extension 176 resiliently widens the annular bead 180 of the fastening section 174 in radially outward direction. After the annular bead 180 has been pushed past, this snaps into place behind the annular collar 182 as a consequence of the resilient properties of the material of the insert member 68, thus into the annular gap between the annular collar 182 and the end surface of the piston 56 facing the pressure chamber 60. The piston subassembly 54 is now mechanically positively fixed to the fastening section 174 of the insert member 68.

Since the piston subassembly 54 is thus captive in a setting in which it is pushed as far as possible into the cylinder housing 52 the slave cylinder 50 requires only a small amount of space for storage, transport and mounting in the motor vehicle. In addition, the slave cylinder 50 can be mounted in the motor vehicle substantially free of force, because the helical compression spring 96 does not have to be compressed, instead being kept in a biased setting by the fastening of the piston subassembly 54 produced by the insert member 68.

For the first actuation of the slave cylinder 50 mounted in the motor vehicle the pressure medium is fed to the pressure chamber 60 by way of the pressure connection 66. As a consequence of the pressure which then builds up in the pressure chamber 60 and acts on the effective area of the piston 56 the piston 56 is subjected to a force which is directed to the left in FIG. 1 and adds to the force of the helical compression spring 96. If the sum of these forces exceeds the holding force of the connection between the extension 176 of the piston 56 and the fastening section 174 of the insert member 68 the annular bead 180 at the fastening section 174 is again widened out by way of the annular collar 182 at the extension 176, whereupon the piston subassembly 54 comes free of the insert member 68. A further fastening of the piston subassembly 54 in operation of the slave cylinder 50 is not intended and also cannot occur, since there is no longer a falling below of the axial spacing, as shown in FIG. 1, between the extension 176 at the piston 56 and the fastening section 174 at the insert member 68 in operation of the slave cylinder 50.

It is apparent from the above description that the holding force of the connection between the extension 176 of the piston 56 and the fastening section 174 of the insert member 68 is constructionally designed in such a manner that on the one hand it is sufficiently larger than the spring force of the helical compression spring 96 in order to prevent unintended loosening of the fastening of the piston subassembly 54, but on the other hand is sufficiently less than the holding force of the connection between the insert member 68 and the cylinder housing 52 so that on first actuation of the slave cylinder 50 the insert member 68 is not pulled out of the pressure connection 66.

As further evident from FIG. 1 the volume receiving means 78 is mounted at the inner circumference of the shroud section 156 of the insert member 68 so that the helix section 168 of the channel 72 coaxially surrounds the volume receiving means 78. For this purpose the insert member 68 has a cylindrical blind bore 184 with which a conically widening introducing section 186, at the left in FIGS. 1 and 6, for the volume receiving means 78 is connected, the introducing section terminating with a small step at the hollow cylinder 178.

Figure 8:
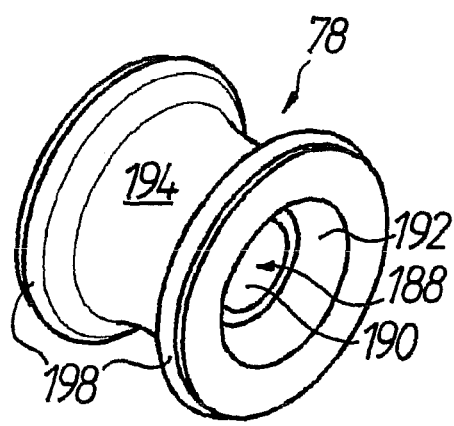
FIG. 8 shows a perspective individual illustration, obliquely from the front, of the elastomeric volume receiving means which, in the case of the slave cylinder according to FIG. 1, is mounted in the insert member.
Figure 9:
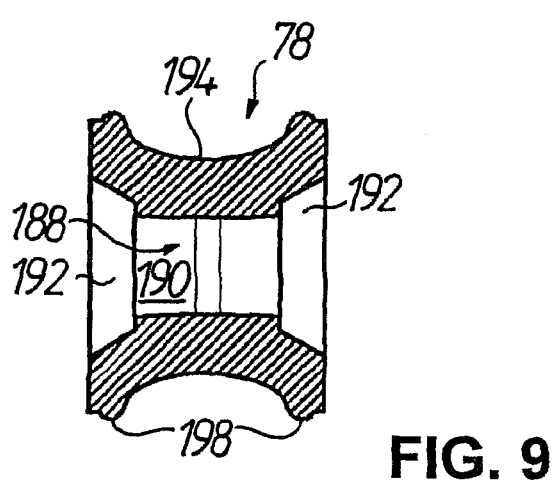
FIG. 9 shows a longitudinal sectional view of the volume receiving means according to FIG. 8.

The volume receiving means 78 shown in more detail in FIGS. 8 and 9 is a rubber-elastic substantially spool-shaped element having a passage bore 188 with a central cylinder section 190 and opening funnels 192 disposed on either side of the cylinder section 190. The volume receiving means 78, which is formed to be rotationally symmetrical with respect to its longitudinal axis and to have mirror symmetry with respect to a notional plane perpendicular to the longitudinal axis, is provided at the outer circumference with a fluted annular recess 194 which, according to FIG. 1, together with the inner circumference of the shroud section 156 of the insert member 68 bounds an annular air chamber 196 in the region of the blind bore 184. The air chamber 196 is sealed on both sides, i.e. in FIG. 1 to the right and the left, by annular sealing beads 198 (see FIGS. 8 and 9) of the volume receiving means 78. The functioning of this volume receiving means 78 was already explained in more detail in the introduction, so that further explanations with respect thereto at this point seem superfluous. In this connection, finally, mention is to be made of the fact that the illustrated arrangement or positioning of channel 72 and volume receiving means 78, in which the volume receiving means 78 as seen from the pressure chamber 60 is hydraulically connected upstream of the channel 72 forming the additional conduit path, has proved particularly effective in terms of damping vibration.

The second, third and fourth embodiments will be described in the following with reference to FIGS. 10 to 17 only to the extent that they differ from the afore-described first embodiment.

Figure 10:
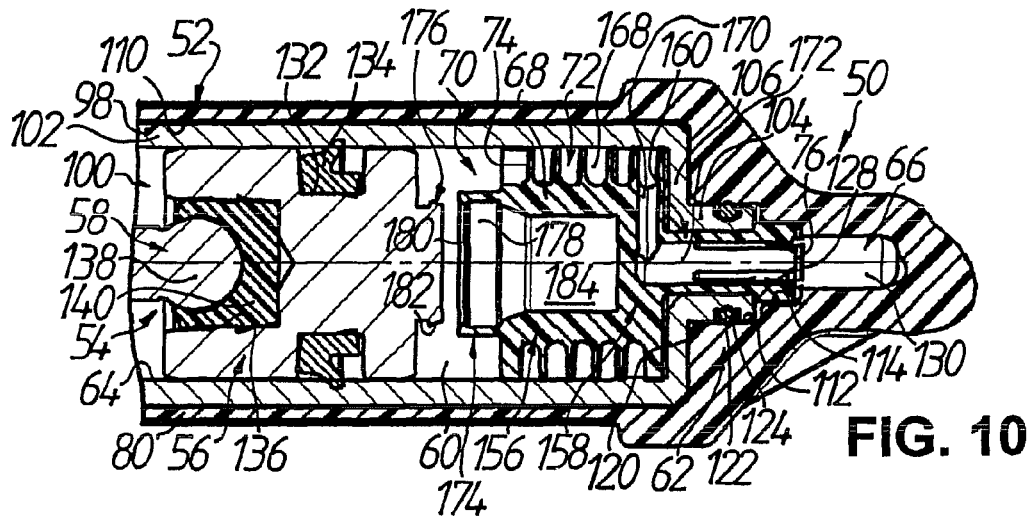
FIG. 10 shows a broken-away longitudinal sectional view of a slave cylinder for a hydraulic clutch actuating system for motor vehicles, in the pressure chamber of which is inserted an insert member equipped with a device for reducing pressure pulses, which device is constantly open to the pressure medium and has merely an additional conduit path in the form of a channel, according to a second embodiment of the invention.

The second embodiment shown in FIG. 10 differs from the first embodiment only in the respect that the device 70 for reducing pressure pulses has merely the channel 72 as additional conduit path, but a volume receiving means is not inserted in the blind bore 184 of the insert member 68, which is unchanged by comparison with FIGS. 1 to 7.

Figure 11:
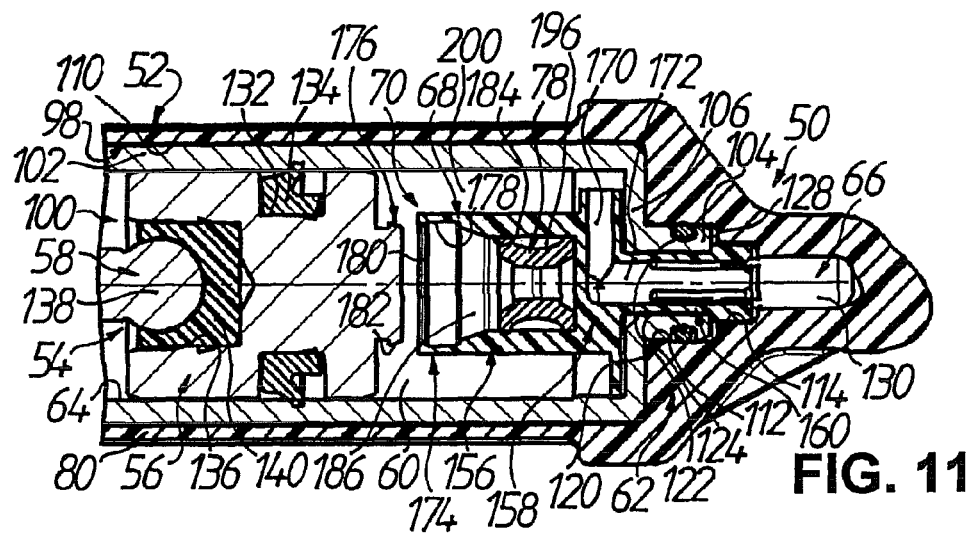
FIG. 11 shows a broken-away longitudinal sectional view of a slave cylinder for a hydraulic clutch actuating system for motor vehicles, in the pressure chamber of which is inserted an insert member equipped with a device for reducing pressure pulses, which device is constantly open to the pressure medium and has merely a volume receiving means, according to a third embodiment of the invention.
Figure 12:
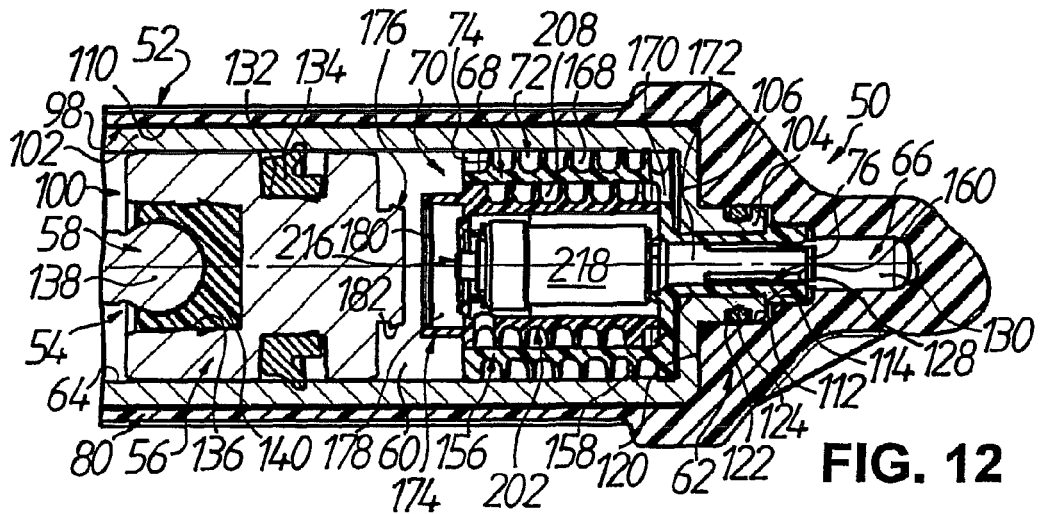
FIG. 12 shows a broken-away longitudinal sectional view of a slave cylinder for a hydraulic clutch actuating system for motor vehicles, in the pressure chamber of which is inserted an insert member equipped with a device for reducing pressure pulses, which device is constantly open to the pressure medium and has an additional conduit path in the form of a channel, wherein the insert member comprises an inner insert which prolongs the channel and in which a thermostatically operating bypass valve is provided, according to a fourth embodiment of the invention.

By contrast, in the third embodiment illustrated in FIG. 11 a volume receiving means 78 according to FIGS. 8 and 9 is inserted in the blind bore 184 of the insert member 68. In exchange, the device 70 for reducing pressure pulses is here not provided with a channel forming an additional conduit path in the afore-described sense; there is quasi a direct, unprolonged connection between pressure chamber 60 and pressure connection 66 and, in particular, by way of a cross-sectionally large annular space 200, which is bounded at the inner circumference by the fastening section 174 and by the outer circumference—with the same outer diameter by comparison therewith—of the shroud section 156 of the insert member 68 and at the outer circumference by the circumferential wall 64 of the cylinder housing 52, as well as by way of the sections 170 and 172 in the base 158 or projection 160 of the insert member 68. In this regard the connecting section 170, in the installed position of the slave cylinder 50, opens into the annular space 200 at the top adjacent to the circumferential wall 64 of the cylinder housing 52 so as to ensure good deaeration of the pressure chamber 60.

Figure 18:
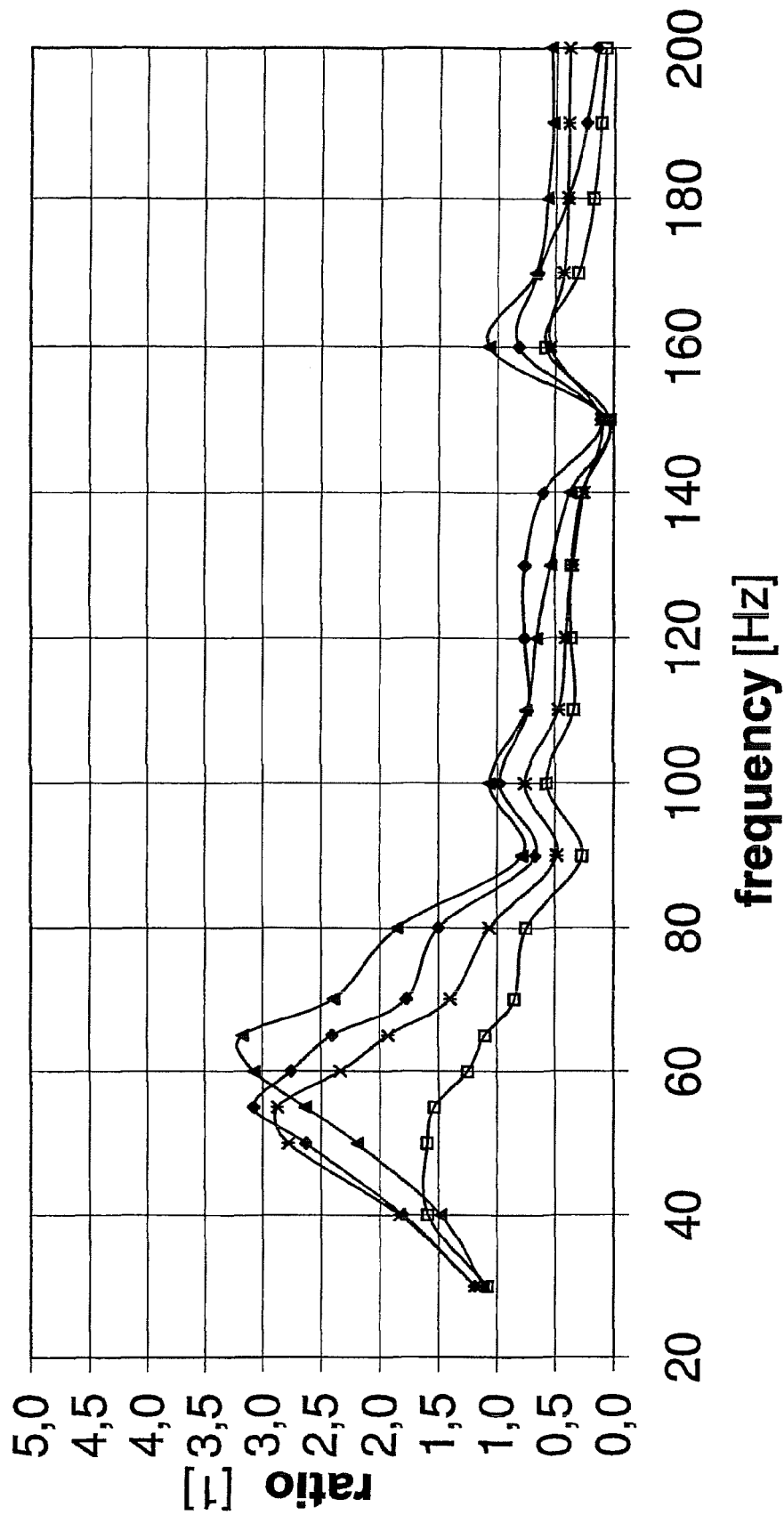
FIG. 18 shows a diagram in which the ratio of the acceleration measured at a piston rod of the master cylinder to the acceleration measured at a piston rod of the slave cylinder is recorded against frequency, as a result of a test in which a sinusoidal vibration with variable frequency and an amplitude of 1 g (9.81 m/s$^2$) was applied to the piston rod of the slave cylinder, for (1st) a hydraulic clutch actuating system without a device for reducing pressure pulses (marked by triangles), (2nd) a hydraulic clutch actuating system with a slave cylinder equipped in correspondence with FIG. 1 (marked with empty squares), (3rd) a hydraulic clutch actuating system with a slave cylinder equipped in correspondence with FIG. 10 (marked with lozenges) and (4th) a hydraulic clutch actuating system with a slave cylinder equipped in correspondence with FIG. 11 (marked with small stars)

As expected, the devices 70 for reducing pressure pulses according to the embodiments of FIGS. 1, 10 and 11 have different vibration damping characteristics, as evident from FIG. 18, which illustrates by way of example the result of tests in which (1st) a sinusoidal vibration with variable frequency and an amplitude of 1 g was applied to the piston rod 58 of the slave cylinder 50, (2nd) the accelerations at a piston rod (not shown) of the master cylinder (not illustrated) hydraulically connected with the slave cylinder 50 and at the piston rod 58 were measured and (3rd) for the test evaluation were recorded, in relation to one another, against the excitation frequency in a diagram. In this connection, use was made of a slave cylinder 50 with an effective piston diameter of 22.20 mm and a master cylinder with an effective piston diameter of 19.05 mm, which were hydraulically connected together by way of—starting from the slave cylinder 50—a pressure line arrangement consisting of (a) an elastomeric clutch hose (internal diameter: approximately 6 mm, external diameter: approximately 12 mm, length: approximately 250 mm, a fabric layer) and (b) a metallic clutch pipe (internal diameter: approximately 4.75 mm, wall thickness: approximately 0.7 mm, length: approximately 610 mm). In the embodiments according to FIGS. 1 and 10 the length of the helix section 168 of the channel 72 of the device 70 for reducing pressure pulses was approximately 200 millimeters, with an open cross-section of approximately 6 mm$^2$, while in the embodiments according to FIGS. 1 and 11 use was made, as volume receiving means 78, of a rubber sealing plug corresponding with FIGS. 8 and 9 with an overall length of approximately 7.3 mm, a maximum external diameter of approximately 9.6 mm in the region of the sealing bead 198 and an internal diameter of approximately 3 mm in the region of the cylinder section 190.

The different vibration damping capabilities of the various tested devices 70 for reducing pressure pulses as well as the effects thereof by comparison with the arrangement without a device for reducing pressure pulses (marked by triangles) are clearly apparent in FIG. 18: not only the case of the embodiment according to FIG. 10 (marked with lozenges), but also in the embodiment according to FIG. 11 (marked with small stars) there are a reduction and shifting of the first maximum (at approximately 65 Hz to lower frequencies), in which connection the volume receiving means 78 alone produces a better damping effect than the channel 72 alone; at higher frequencies the damping effect of the channel 72 tends to increase by comparison with the volume receiving means 78. The combination of the two measures in correspondence with the embodiment according to FIG. 1 (marked with empty squares) leads to an overall damping effect which in sum clearly exceeds the individual effects; all vibration maxima are strongly 'depressed', at least by approximately 50%, and here, too, a displacement of the first maximum towards lower frequencies takes place. It is clear to the expert that these results are to be understood only as exemplifying and the device 70 for reducing pressure pulses can be optimized as desired with respect to its vibration damping effect for the respective installation situation with regard to, obviously, the amplitude ratio or the frequency range to be damped, be it through selectable use of channel 72 and/or volume receiving means 78 or a change of the shape/dimensions of channel 72 or volume receiving means 78 or of the material of the volume receiving means 78.

In the fourth embodiment illustrated in FIGS. 12 to 17 the insert member 68, which is again inserted in the pressure chamber 60 and secured in the pressure connection 66, comprises an inner insert 202 of substantially pot-shaped construction, with (see, in particular, FIGS. 13, 15 and 17) an inner insert shroud section 204 and an inner insert base 206. Formed between the shroud section 156 of the insert member 68 and the inner insert shroud section 204 is a helically extending helix section prolongation 208, one end of which is according to FIGS. 13 and 15 in fluid connection with the (outer) helix section 168 by way of the connecting section 170 and the other end of which is in fluid connection with an interior space 210 of the inner insert 202 by way of a passage 209, which interior space in turn communicates with the pressure connection 66 by way of the end section 172 in the extension 160. In that case the helix section prolongation 208 is again formed at the outer circumference of the inner insert shroud section 204 as a groove, which is covered radially outwardly by an inner circumferential surface 212 of the shroud section 156 of the insert member 68. The inner insert 202, which is similarly injection-molded from a suitable plastics material, is so inserted into the insert member 68 and secured therein (for example glued or ultrasonically welded) that the inner insert shroud section 204 bears against the base 158 of the insert member 68, whereby the mutually opposite bases 158 and 206 bound the interior space 210 in axial direction, while the interior space 210 is bounded radially outwardly by an inner circumferential surface 214 of the inner insert shroud section 204. The hollow cylinder 178 of the fastening section 174 is formed at the inner insert 202 on the side of the inner insert base 206 facing the pressure chamber 60.

As evident from a comparison of, for example, FIGS. 1 (6) and 12 (13), in the fourth embodiment the channel 72 is significantly longer than the channel 72 in the first embodiment, due to the helix section prolongation 208 and the circumstance that the helix section 168 at the shroud section 156 of the insert member 68 includes a greater number of turns (here seven complete turns), and has in addition a smaller free cross-section. In such a construction of the channel 72 an undesired increase in the force, which is to be applied to the clutch pedal, in case of quick actuation and an equally undesired decrease in the return speed of the clutch pedal can occur, particularly at low temperatures at which the hydraulic medium—usually brake fluid—is relatively viscous, due to the higher flow resistance. In order to counteract this problem, provided in the insert member 68 is a thermostatically operating bypass valve 216 which is hydraulically connected in parallel with respect to the device 70 for reducing pressure pulses and which provides a direct fluid connection between the pressure chamber 60 and the pressure connection 66 at low temperatures and interrupts this fluid connection at higher temperatures.

As can be inferred particularly from FIGS. 13, 15 and 17, the bypass valve 216 comprises a thermostatic element 218, which is accommodated in the interior space 210 of the inner insert 202 between the base 158 of the insert member 68 and the inner insert base 206 and which is operatively connected with a plunger 220 which opens and closes an opening 222 in the inner insert base 206 in dependence on temperature (the closed state is shown in the figures) in order to provide the direct fluid connection between the pressure chamber 60 and the pressure connection 66 at low temperatures and to interrupt this fluid connection at higher temperatures. In this regard the thermostatic element 218 is supported on the side, which is at the right in FIG. 13, on several projections 224 which are distributed over the circumference of the end section 172 and integrally formed at the insert member 68 and which keep the thermostatic element 218 at a spacing from the base 158 so that the hydraulic medium can pass through passages between the individual projections 224 from the interior space 210 to the end section 172 and conversely. On the side at the left in FIG. 13 the thermostatic element 218 is held by a thickened end in a profile section 226 of the inner insert 202, which has an approximately flower-shaped cross-section (see FIG. 14) so that the hydraulic medium can flow through between the inner insert shroud section 204 and the outer circumference of the thermostatic element 218.

It is apparent that a hydraulic connection is always present between the pressure chamber 60 and the pressure connection 66 in the fourth embodiment as well and in particular—starting from the pressure chamber 60—by way of the opening 74 at the slave cylinder side, the helix section 168, the connecting section 170, the helix section prolongation 208, the passage 209, the free cross-sections between the thermostatic element 218 and the inner insert shroud section 204 or the base 158 of the insert member 68, respectively, the end section 172 and finally the opening 76 at the master cylinder side. A change in length at the thermostatic element 218 occurs at low temperatures, whereby the plunger 220 is drawn in the direction of the interior space 210 out of the opening 222 in the inner insert base 206 so that a connection between the pressure chamber 60 and the pressure connection 66 is additionally created by way of the hollow cylinder 178, the opening 222, the profile section 226 and further as described above.

In connection with the fourth embodiment it is to be finally noted that in this embodiment as well a volume receiving means (not illustrated) similar to the afore-described volume receiving means 78 can be provided, for example with adapted dimensioning, in the hollow cylinder 178.

A slave cylinder for a vibration-damped hydraulic force transmission system, particularly a hydraulic clutch actuating system for motor vehicles, is disclosed, with a cylinder housing, a piston received therein to be longitudinally displaceable and a pressure chamber, which is bounded by the cylinder housing and the piston and can be selectably acted on by a pressure medium via a pressure connection provided in the cylinder housing in order to displace the piston in the cylinder housing. In addition, an insert member inserted in the pressure chamber and secured in the pressure connection is provided, the insert member being equipped with a device, which is constantly open to the pressure medium, for reducing pressure pulses. As a result, the vibration-damping measures or means are integrated in the slave cylinder in a particularly economic and space-saving manner.

Other variations and modifications are possible without departing from the scope and spirit of the present invention as defined by the appended claims.

We claim:
1. A slave cylinder for a vibration-damped hydraulic force transmission system, comprising:
   a cylinder housing,
   a piston subassembly received in the cylinder housing to be longitudinally displaceable therein, the piston subassembly comprising a piston and a piston rod connected with the piston at least rigidly in tension and compression, the cylinder housing and one side of the piston together bounding a pressure chamber for a pressure medium,
   said piston rod extending from another side of said piston and extending out of said cylinder housing at an end remote from said pressure chamber for engagement to an actuation device,
   pressure connection means provided in the cylinder housing and arranged to supply pressure medium to the pressure chamber so as to displace the piston and the piston rod in the cylinder housing, and
   an insert member inserted in the pressure chamber within the cylinder housing and secured in the pressure connection means, the insert member being equipped with pressure pulse reducing means for reducing pressure pulses in the pressure medium, the pressure pulse reducing means being constantly open to the pressure medium wherein the pressure pulse reducing means comprises both:
      a volume receiving means mounted within the axial confines of the insert member and elastically deformable under pressure, and
      a channel with an opening towards the pressure chamber and an opening towards the pressure connection means, said channel having a helically extending helix section within the axial confines of the insert member, so that a length of said channel is greater than a direct spacing between the two openings.

2. A slave cylinder according to claim 1, wherein the insert member is of substantially pot-shaped construction comprising a shroud section and a base, and has a substantially hollow-cylindrical extension which is inserted into the pressure connection means of the cylinder housing and is connected with the insert member base.

3. A slave cylinder according to claim 2, wherein the extension of the insert member has a free end and is provided at its outer circumference with an annular collar extending from the free end, the extension having multiple longitudinal slots for formation of a plurality of spring arms to produce a snap connection securing the insert member in the pressure connection means of the cylinder housing by axial mechanically positive coupling, and the pressure connection means including an annular end surface remote from the pressure chamber, wherein in the secured state of the insert member, the annular collar at the extension engages behind said annular end surface.

4. A slave cylinder according to claim 3, wherein the cylinder housing comprises a base body of plastics material provided with a bore and further comprises a metallic guide sleeve for the piston inserted in the bore, said annular end surface in the pressure connection means of the cylinder housing being formed by an end of the guide sleeve.

5. A slave cylinder according to claim 2, wherein the helically extending helix section is formed by a groove at the outer circumference of the shroud section of the insert member, the groove being covered radially outwardly by an inner circumferential surface of the cylinder housing.

6. A slave cylinder according to claim 5, wherein the channel comprises a connecting section extending in the base of the insert member and further comprises an end section which is foamed by the extension of the insert member and which is connected with the helix section by the connecting section.

7. A slave cylinder according to claim 2, wherein said volume receiving means being mounted at the insert member and elastically deformable under pressure, and the volume receiving means being mounted at an inner circumference of the shroud section of the insert member.

8. A slave cylinder according to claim 7, wherein the volume receiving means comprises a rubber-elastic spool-shaped element defining a passage bore and an annular recess at the outer circumference, the recess together with the inner circumference of the shroud section of the insert member bounding an annular air chamber.

9. A slave cylinder according to claim 1, wherein the insert member is secured in the pressure connection means of the cylinder housing by axial mechanically positive coupling.

10. A slave cylinder according to claim 9, wherein the insert member is secured in the pressure connection means of the cylinder housing by means of a snap connection.

11. A slave cylinder according to claim 1, wherein the piston has an extension at an end thereof towards the pressure chamber and the insert member has at an end thereof towards the pressure chamber a fastening section which so co-operates with the extension of the piston that the piston prior to filling of the slave cylinder with pressure medium or prior to first actuation of the slave cylinder is fixed in a predetermined stroke setting with respect to the cylinder housing and is releasable relative to the cylinder housing when filling of the slave cylinder with pressure medium or first actuation of the slave cylinder takes place.

12. A slave cylinder according to claim 11, wherein the fastening section of the insert member comprises a hollow cylinder which is axially aligned with respect to a center axis of the pressure chamber and which is provided with an annular bead at its inner circumference, and wherein the central extension of the piston is provided at the outer circumference with an annular collar which engages behind the annular bead to fix the piston in said predetermined stroke setting.

13. A slave cylinder according to claim 1, wherein the insert member is injection-molded from a plastics material.

14. A vibration-damped hydraulic force transmission system comprising a slave cylinder having:
a cylinder housing that is horizontally extending,
a piston subassembly received in the cylinder housing to be longitudinally displaceable therein, the piston subassembly comprising a piston and a piston rod connected with the piston at least rigidly in tension and compression, the cylinder housing and one side of the piston together bounding a pressure chamber for a pressure medium,
said piston rod extending from another side of said piston and extending out of said cylinder housing at an end remote from said pressure chamber for engagement to an actuation device,
pressure connection means provided in the cylinder housing and arranged to supply pressure medium to the pressure chamber so as to displace the piston and the piston rod in the cylinder housing, and
an insert member inserted in the pressure chamber and secured in the pressure connection means, the insert member being equipped with pressure pulse reducing means for reducing pressure pulses in the pressure medium, the pressure pulse reducing means being constantly open to the pressure medium wherein the pressure pulse reducing means comprises both:
a volume receiving means mounted at the insert member within the axial confines of an insert member and elastically deformable under pressure, and
a channel with an opening towards the pressure chamber and an opening towards the pressure connection means, said channel having a helically extending helix section within the axial confines of the insert member so that a length of said channel is greater than a direct spacing between the two openings.

15. A vibration-damped hydraulic force transmission system according to claim 14, the system being a hydraulic actuating system for a clutch of a motor vehicle engine.

16. A vibration-damped hydraulic force transmission system according to claim 14, wherein the helix section of the channel has a cross-section at most equal to the minimum cross-section of the pressure connection means.

17. A vibration-damped hydraulic force transmission system according to claim 14, wherein the opening of the channel towards the pressure chamber side is disposed at a top of the cylinder housing adjacent to an inner circumferential surface of the cylinder housing when in an installed position of the slave cylinder.

18. A slave cylinder for a vibration-damped hydraulic force transmission system comprising:
a cylinder housing,
a piston subassembly received in the cylinder housing to be longitudinally displaceable therein, the piston subassembly comprising a piston and a piston rod connected with the piston at least rigidly in tension and compression, the cylinder housing and the piston together bounding a pressure chamber for a pressure medium,
pressure connection means provided in the cylinder housing and arranged to supply pressure medium to the pressure chamber so as to displace the piston and the piston rod in the cylinder housing,
an insert member inserted in the pressure chamber and secured in the pressure connection means, the insert member being equipped with pressure pulse reducing means for reducing pressure pulses in the pressure medium, the pressure pulse reducing means being constantly open to the pressure medium, wherein the pressure pulse reducing means comprises a channel with an opening towards the pressure chamber and an opening towards the pressure connection means, the channel having a helically extending helix section so that a length of said channel is greater than a direct spacing between the two openings, and wherein the pressure pulse reducing means comprises a volume receiving means mounted at the insert member and elastically deformable under pressure, the helix section of the channel coaxially surrounding the volume receiving means.

19. A slave cylinder for a vibration-damped hydraulic force transmission system comprising:

a cylinder housing, a piston subassembly received in the cylinder housing to be longitudinally displaceable therein, the piston subassembly comprising a piston and a piston rod connected with the piston at least rigidly in tension and compression, the cylinder housing and the piston together bounding a pressure chamber for a pressure medium, pressure connection means provided in the cylinder housing and arranged to supply pressure medium to the pressure chamber so as to displace the piston and the piston rod in the cylinder housing, an insert member inserted in the pressure chamber and secured in the pressure connection means, the insert member being equipped with pressure pulse reducing means for reducing pressure pulses in the pressure medium, the pressure pulse reducing means being constantly open to the pressure medium, wherein the pressure pulse reducing means comprises a channel with an opening towards the pressure chamber and an opening towards the pressure connection means, the channel having a helically extending helix section so that a length of said channel is greater than a direct spacing between the two openings, and wherein the pressure pulse reducing means comprises a volume receiving means mounted at the insert member and elastically deformable under pressure, the volume receiving means as seen from the pressure chamber being hydraulically upstream of the channel.

* * * * *